April 26, 1960  A. H. CANADA  2,934,755
DEVICE FOR DIRECTING RADIATED ENERGY
Filed April 28, 1955  2 Sheets-Sheet 2

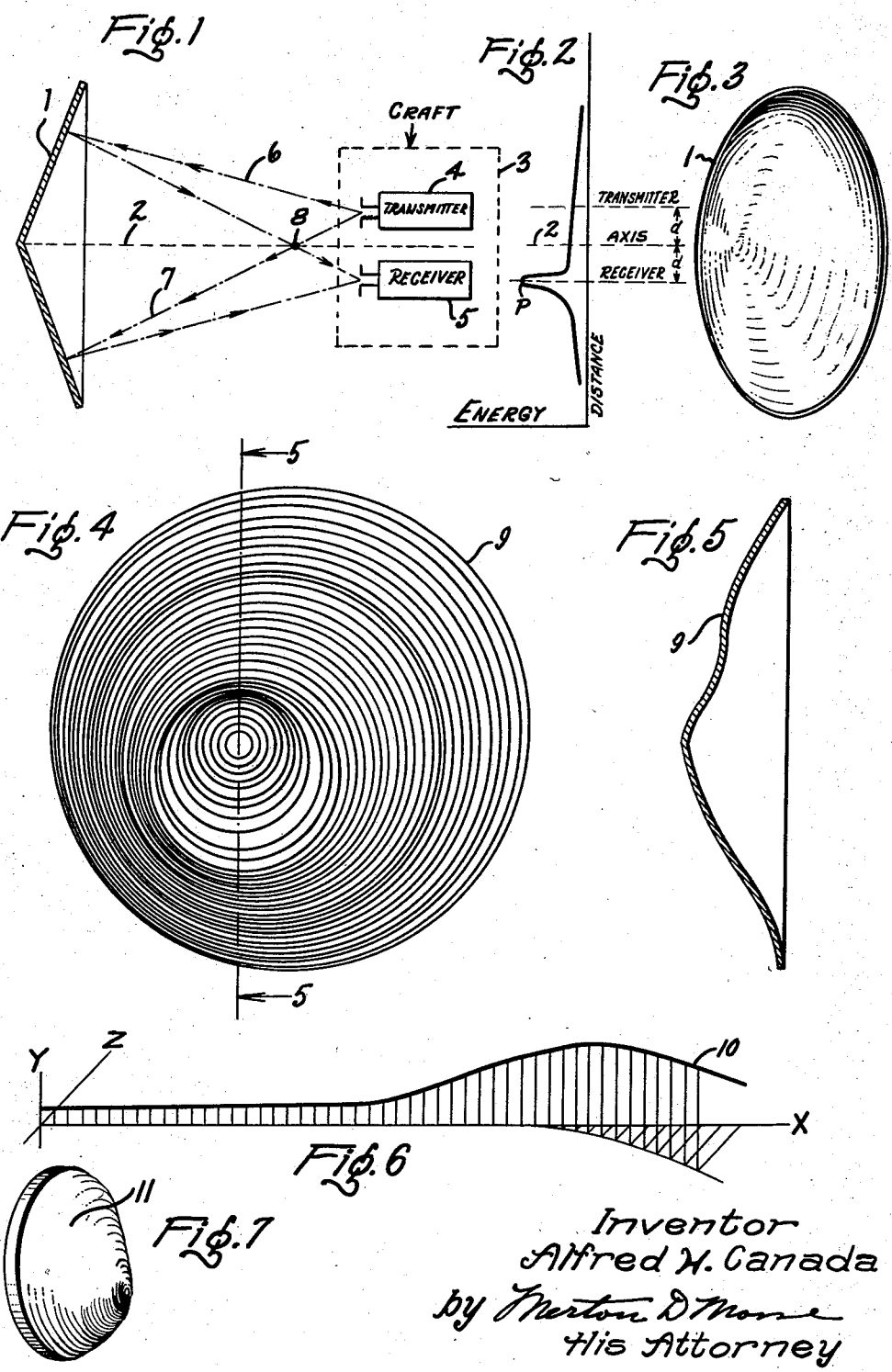

Inventor
Alfred H. Canada
by Merton D Morse
His Attorney

United States Patent Office 2,934,755
Patented Apr. 26, 1960

2,934,755

DEVICE FOR DIRECTING RADIATED ENERGY

Alfred H. Canada, Schenectady, N.Y., assignor to General Electric Company, a corporation of New York Application April 28, 1955, Serial No. 504,565

2 Claims. (Cl. 343—5)

This invention relates to a device such as a lens or reflector for directing radiated energy, and also to an object guidance system incorporating such a lens or reflector.

Kodak Pamphlet No. U-1, entitled "The Axicon: A New Optical Element Its Application to Problems of Alignment," recently published by Eastman Kodak Co., discloses a new type of lens called an "axicon," which is a lens having a plane surface and a conical surface. Such a lens differs radically from lenses previously known in the art, in that light from point sources disposed along the straight line axis of the lens and directed toward its conical surface is focused at a single point along the axis behind the plane surface of the lens. This is in contradistinction to the usual type of spherical lens in which the surfaces are designed to bend each light ray emanating from a source on one side of the lens to form an image that is a defined distance on the other side of the lens. In such spherical lenses the reciprocal of the image distance equals the reciprocal of the focal length plus the reciprocal of the object distance. This is not true for this new type of lens, since it does not have a single focal length but rather has a different focal length for each radial zone on its surface. Further, if the plane face of the lens is silvered, the light from a point source of light disposed a given distance above the axis of the "axicon" will have a focus at the same given distance below the axis and directly below the point source of light.

The theory of such lenses is presented in the Journal of the Optical Society of America, vol. 44, No. 8, pages 592–597, August 1954, in an article entitled, "The Axicon: A New Type of Optical Instrument," by J. H. McLeod. As is made clear in this article, the "axicon" is a surface of revolution which directs light from a point source on its axis of revolution to a range of points on its axis.

Such a lens may be used to align a series of point sources of light in order to define accurately a straight line by determining when the sources of light are on the axis of the lens, without using telescopes or stretching wires between the points to be aligned; however, the lens does not define a line in space other than a straight line.

The present invention defines a curved line in space, using the above principles. Further, it adapts the above principles to use in reflectors of radiated energy in order to guide objects along either a straight or a curved path.

An object of this invention is to provide a device for directing radiated energy so as to define a curved line in space.

Another object of this invention is to provide an object guidance system incorporating a reflecting device for directing radiated energy so as to define a line in space having any desired configuration, which an object may follow.

Other objects and advantages will appear as the description of the invention proceeds.

In accordance with the invention, it is proposed to construct a device for directing energy toward a series of focal points in space which lie along a curved line, and to derive this device by defining its energy directing surface with a series of circles of ever-increasing diameters from an apex and having centers which do not lie along a straight line. Such a device could be a skewed, conical-type of reflector or lens. Also, in accordance with the invention, an object guidance system is disclosed for utilizing a conical reflector which may either have a skewed or a straight line axis, this reflector being used to guide a moving object along either a curved or a straight line path. Such guidance is achieved by having a transmitter of enrgy disposed on the moving object for directing energy toward the reflector, and by also having a receiever of the energy sent back by the reflector disposed on the moving object a fixed distance apart from the transmitter. The receiver receives its maximum reflected energy when the reflector axis is midway between it and the transmitter, and the object is then guided along this axis by noting the receiver output. Therefore, the object can be made to follow a line in space similar to that defined by the axis of the reflector, whether the reflector be skewed or straight.

The features of this invention which are believed to be novel and patentable are pointed out in the claims which form a part of this specification. For a better understanding of this invention, reference is made in the following description to the accompanying drawing, wherein like parts are indicated by like reference numerals, in which:

Fig. 1 shows, in block diagram form, an object guidance system embodying the principles of the invention, the reflector being shown in cross-section;

Fig. 2 is a graph plotting the distribution of the energy from the reflector of Fig. 1 in the plane of the transmitter and receiver of the object guidance system;

Fig. 3 is a perspective view of the conical reflector shown in Fig. 1;

Fig. 4 is a plan view of a skewed, conical-type reflector constructed in accordance with the invention;

Fig. 5 is a cross-sectional view taken along line 5—5 of the reflector shown in Fig. 4;

Fig. 6 is a 3-dimensional graph illustrating the loci of points of maximum energy return for the transmitter and receiver of Fig. 1 when used with the reflector of Figs. 4 and 5;

Fig. 7 shows a perspective view of a skewed, conical-type lens constructed in accordance with the principles of the invention.

Figure 8:
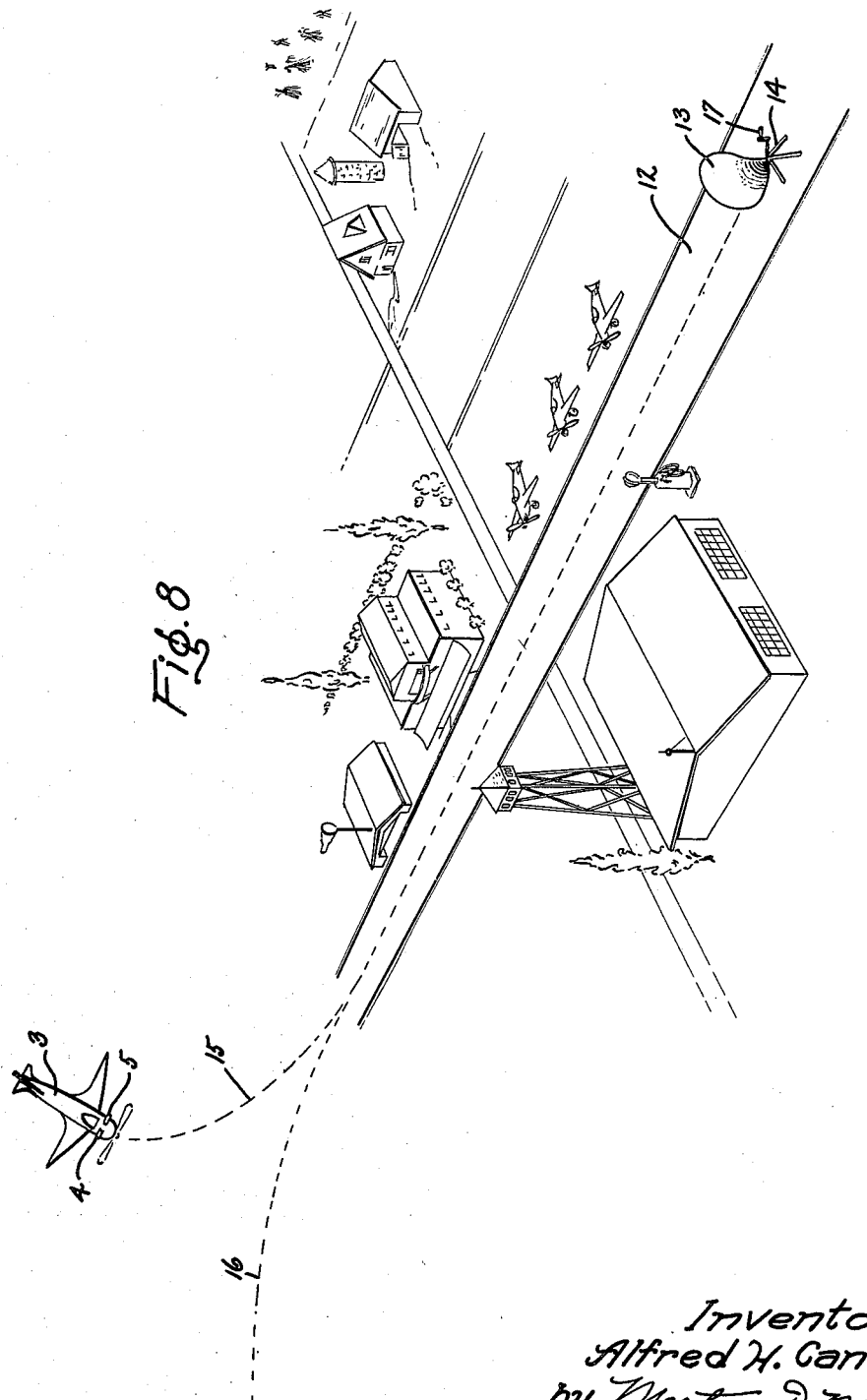
Fig. 8 shows a perspective view of an aircraft landing system incorporating the reflector of the invention.

Referring now to Fig. 1, there is disclosed an object guidance system incorporating a reflector in accordance with the invention. In this figure is shown a cross-sectional view of a reflector 1 with a reflecting surface that is formed by a series of circles having centers which lie in a straight line 2. As will be seen from Fig. 3, reflector 1 has the general appearance of a cone. The reflecting surface of reflector 1 may be metallic, if electrical energy is to be reflected, or a polished or silvered surface, if light energy is to be reflected. Disposed in front of reflector 1 is a craft 3, which may be an airplane, automobile, ship, etc. Craft 3 bears a transmitter 4 for directing energy toward reflector 1, and a receiver 5 for receiving the energy reflected from the reflector 1. Elements 4 and 5 are fixedly spaced apart and mounted upon craft 3. Energy source 4 may constitute a radar transmitter like any one of those shown in "Radar System Fundamentals," NAVSHIPS 900,017, published by the Bureau of Ships Navy Department, in 1944. If light energy is being used, source 4 could be a searchlight. Receiver 5 may comprise a radar receiver of any of the types shown in the aforementioned NAVSHIPS publication, and if light energy is being used, this element may comprise a slotted disc or a photoelectric cell-amplifier combination.

As will be seen from Fig. 1, when transmitter 4 radiates energy in directions indicated by 6 and 7 toward reflector 1, there is only one position of the craft in which receiver 5 receives a maximum of the energy reflected from the reflector. That position is when the axis or center line 2 of the reflector bisects the distance between the transmitter 4 and the receiver 5. In this position, the energy radiated in the direction indicated at 6 rebounds from reflector 1 and passes through a point 8 on the axis of the reflector and into the receiver 5. The energy radiated in the direction indicated at 7 also passes through point 8 and rebounds from reflector 1 into receiver 5. Similarly, energy striking any part of a circular zone on the reflector defined by direction lines 6 and 7 will be redirected to the receiver. Only when the axis 2 of the reflector bisects the distance between transmitter 4 and receiver 5 does energy from rays deflected by this zone enter receiver 5, and a definite energy peak can then be detected by this receiver. This peak is shown at P in the curve of Fig. 2, which curve illustrates the intensity of energy received from the reflector 1 plotted as abscissa against the position of the transmitter and the receiver relative to the axis 2 of the reflector plotted as ordinate. It will be seen from this graph that there is a definite energy peak to be found at receiver 5 when the receiver and the transmitter are the same distance from the axis 2 of reflector 1, as indicated by the distances represented in Fig. 2 by the characters "d." Therefore, by causing the craft 3 to follow such a course that receiver 5 always receives a maximum of energy from reflector 1, the craft can be made to follow a straight line course along the axis 2 of the reflector 1.

Thus the system of Figs. 1 and 3 may be employed as a guidance system for aircraft or other moving vehicles incorporating a reflector made in accordance with the principles of the invention. The system is not limited to pulses or beams of electrical energy, but can also be used with light energy. Although the system is illustrated as mounted upon a moving craft and can be used to guide the craft along a straight line course to the reflector, it should be understood that the reflector may be mounted upon a moving craft and the transmitter and receiver may be fixed in position. The receiver would then serve to record any deviation from a straight line path of the moving object upon which the reflector was mounted. Moreover, the reflector could be mounted upon a moving craft and the transmitter and receiver could be mounted upon another moving craft, the two crafts being able to track one another by using the principles of the invention.

Referring now to Figs. 4 and 5, there is shown a reflector 9 having a reflecting surface with a skewed conical shape which is defined by a series of circles on parallel planes and whose centers lie along a curved line. It will be readily appreciated by one skilled in the art that a skewed conically-shaped reflector similar to the "axicon" type reflector may be used to define a curved line or path in space, the configuration of the line being a function of the configuration of the reflector. The axis of reflector 9 is, therefore, not the straight line axis shown in Fig. 1, but follows a curved path defined by the locus of the centers of the surface defining circles. The particular reflector shown in Figs. 4 and 5 is illustrated as so shaped that its axis follows a curve 10 shown in Fig. 6. This curve is drawn along the X–Y–Z, 3-dimensional axes conventionally used in mathematics, and it will be seen that it lies within the plane of the drawing as well as outside of it. It is to be observed that the spacing of the parallel planes on which the series of circles whose centers lie along the curved line or the function of the curved line can be varied to define a predetermined curved line or path. Thus, the shape of the axis of reflector 9 is chosen to simulate a possible approach path of an aircraft, which may be thought of as flying first toward the drawing along a path represented by the right end of the curve and thereafter flying within the plane of the drawing toward the origin of the curve. Reflector 9 would therefore be used to replace reflector 1 where it is desired to guide an airplane down onto a landing field along a predetermined flight course. The aircraft would then trace the flight path shown by line 10 in Fig. 6. A plurality of reflectors 9 could be provided at the landing field in order to change the landing pattern in accordance with changes in flight conditions. It will be apparent from the foregoing that a reflector having any desired axis configuration could be constructed, and that a craft can be caused to follow along this curved axis.

Other uses for such reflectors as 9 will readily occur to those skilled in the art. For example, instead of using such reflectors to land aircraft, they could be used to guide robot planes through any given flight path.

Referring now to Fig. 7, there is shown a skewed, conical lens which may be made of a material which refracts light, such as glass, and which incoporates the principles of the invention. This lens is the optical equivalent of the reflector 9 in Figs. 4 and 5, and it has a surface which is defined by a series of circles of successively increasing diameters from the apex and having centers which lie along a curved line. The lens 11 is shown as also having a plane surface, although that is not essential to the invention. Lens 11 will focus a series of point sources of light, disposed along a curved path conforming to the axis thereof, upon a single point behind its plane surface. Therefore, either an observer or a photodetector positioned behind the plane surface of the lens can accurately align a series of lights and cause them to fall precisely upon a predetermined curved pattern in space. Also, the observer or photodetector could follow the path of a craft bearing a searchlight which is directed toward the skewed, conical surface of the lens and would be able to determine immediately whether or not the craft was following the curved path predetermined by the axis of the lens. Such a lens could therefore be used to guide a plane down to a landing field by notifying the pilot by radio of any deviation from a predetermined course in space.

Referring now to Fig. 8, there is shown an embodiment of the invention which could be used to guide an airplane down to a landing field along more than one landing path. In this figure, there is shown an airfield landing run-way 12 having at one end a reflector 13 rotatably mounted upon a stand 14. Reflector 13 is constructed in accordance with the principles of the invention outlined above and is adapted to guide an airplane 3 having a transmitter 4 and a receiver 5 mounted thereupon along a path shown by a dotted line 15. As was explained above, if the circles which form the reflecting surface of reflector 13 are of ever-increasing diameters with centers which are disposed along a line similar to line 15, aircraft 3 will be guided down toward the reflector.

Another dotted line 16 is shown in this figure as leading toward reflector 13. This line is similar to line 15, and represents another possible course for the aircraft 3. This new course would be traced in space by the energy reflected from reflector 13 if the reflector were to be rotated on its stand 14 by an arm 17 so that its center line was similar to line 16. Therefore, if wind changes made it necessary, reflector 13 could guide aircraft 3 down any suitable landing path, the paths being changed merely by rotating the reflector to the desired position.

It should be understood that the novelty of the present invention does not reside in any particular axial curvature of the energy directing device, since many other curves may well be found to be useful by those skilled in the art. Moreover, the shape of the body of the reflector is immaterial, provided that its reflecting surface conforms with the principles of the invention. Further, it should be understood that it is well known in the art that forms of electromagnetic energy, other than light, can be refracted, and that the invention is not limited to optical lenses alone. For example, radio waves can be refracted and suitable lenses that would be the equivalent of that shown in Fig. 7 could readily be constructed for such waves, and the novel object guidance system of the invention could incorporate such lenses.

While there have been described what are at present considered preferred embodiments of the invention, it will be obvious to those skilled in the art that various changes and modifications may be made therein without departing from the invention; and it is aimed in the appended claims to cover all such changes and modifications as fall within the true spirit and scope of the invention.

What I claim as new and desire to secure by Letters Patent of the United States is:

1. A guidance ssytem comprising, transmitter means for radiating energy, receiver means for receiving energy and fixedly spaced from said transmitter means, and an energy reflector receptive of radiated energy from said transmitter means for focusing the energy at said receiver means, said reflector having an energy directing surface that is defined by a series of circles in parallel planes, said circles having ever-increasing diameters from an apex and centers lying along a given line, the energy reflected from said energy directing surface being focused at said receiver means when said receiver means is the same distance as said transmitter means from a line in space similar to said given line.

2. A craft guidance system comprising, transmitter means for radiating energy and positioned upon a movable craft, receiver means for receiving energy and fixedly spaced from said transmitter means upon said movable craft, and an energy reflector receptive of radiated energy from said transmitter means for focusing the energy at said receiver means, said reflector having an energy directing surface that is defined by a series of circles in parallel planes, said circles having ever-increasing diameters from an apex and centers lying along a given line for focusing the energy at said receiver means when said receiver means is the same distance as said transmitter means from a line in space similar to said given line, thus ensuring that said craft is moving along a similar line in space.

References Cited in the file of this patent

UNITED STATES PATENTS

| | | |
|---|---|---|
| 2,405,989 | Beach | Aug. 20, 1946 |
| 2,502,974 | McElhannon | Apr. 4, 1950 |
| 2,543,130 | Robertson | Feb. 27, 1951 |

FOREIGN PATENTS

| | | |
|---|---|---|
| 618,460 | Great Britain | Feb. 22, 1949 |